United States Patent [19]

Law et al.

[11] Patent Number: 5,244,761
[45] Date of Patent: Sep. 14, 1993

[54] IMAGING MEMBERS WITH FLUORINATED TRISAZO PHOTOGENERATING MATERIALS

[75] Inventors: Kock-Yee Law, Penfield; Ihor W. Tarnawskyj, Rochester, both of N.Y.

[73] Assignee: Xerox Corporation, Stamford, Conn.

[21] Appl. No.: 825,247

[22] Filed: Jan. 24, 1992

[51] Int. Cl.⁵ .......................... G03G 5/047; G03G 5/06
[52] U.S. Cl. ......................................... 430/59; 430/58; 430/79
[58] Field of Search .............................. 430/58, 59, 79

[56] References Cited

U.S. PATENT DOCUMENTS

| | | |
|---|---|---|
| 3,898,084 | 8/1975 | Champ et al. |
| 4,507,471 | 3/1985 | Ohta ................................. 534/755 |
| 4,735,882 | 4/1988 | Yamashita et al. ............. 430/79 X |
| 4,916,039 | 4/1990 | Hashimoto et al. ................ 430/57 |
| 4,925,758 | 5/1990 | Hashimoto et al. ................ 430/57 |
| 4,971,876 | 11/1990 | Kuroda et al. ..................... 430/75 |
| 4,977,051 | 12/1990 | Ohno et al. ........................ 430/58 |

FOREIGN PATENT DOCUMENTS 217354 8/1989 Japan ................................. 430/79

Primary Examiner—Roland Martin
Attorney, Agent, or Firm—E. O. Palazzo

[57] ABSTRACT

An imaging member comprised of supporting substrate, a photogenerator layer comprised of fluorinated trisazo pigments as essentially represented by the formula

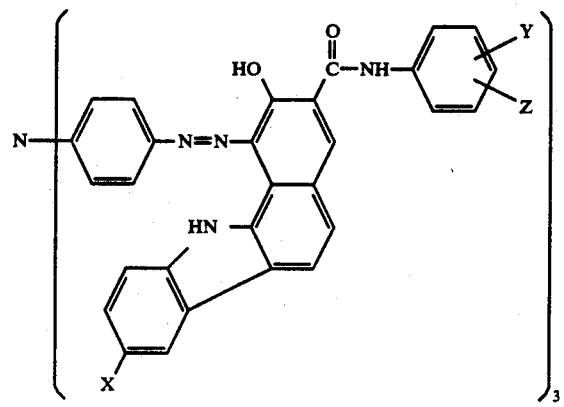

wherein X is halogen, i.e. chlorine or fluorine, and Y and Z are selected from the group consisting of H, F, Cl, Br, alkyl containing of from 1 to 25 carbon atoms, $CF_3$, $NO_2$, alkoxy, and OH in the anilide coupler moiety, and wherein at least one of the substituents X, Y and Z is F or $CF_3$, and a charge transport layer.

25 Claims, 3 Drawing Sheets

IMAGING MEMBERS WITH FLUORINATED TRISAZO PHOTOGENERATING MATERIALS

BACKGROUND OF THE INVENTION

The present invention is directed generally to photoresponsive imaging members, and more specifically to photoconductive imaging members comprised of certain fluorinated trisazo photogenerating pigments. In one embodiment the trisazo photogenerating pigments are obtained from trisaminoaryl amines. One embodiment of the present invention is directed to an imaging member comprised of a supporting substrate, a photogenerating layer comprised of a fluorinated triazo photogenerating pigment in contact therewith, and a charge, especially hole transport layer. Imaging members with the fluorinated trisazo photogenerating pigments of the present invention are sensitive to wavelengths of from about 400 to about 800 nanometers, that is from the visible region to the near infrared wavelength region of the light spectrum. Moreover, in embodiments thereof the imaging members of the present invention possess low dark decay characteristics as illustrated herein.

Photoresponsive imaging members are known, such as those comprised of a homogeneous layer of a single material such as vitreous selenium, or composite layered devices containing a dispersion of a photoconductive composition. An example of a composite xerographic photoconductive member is described in U.S. Pat. No. 3,121,006, which discloses finely divided particles of a photoconductive inorganic compound dispersed in an electrically insulating organic resin binder. Imaging members prepared according to the teachings of this patent contain a binder layer with particles of zinc oxide uniformly dispersed therein coated on a paper backing. The binders disclosed in this patent include materials such as polycarbonate resins, polyester resins, polyamide resins, and the like, which are incapable of transporting injected charge carriers generated by the photoconductive particles for any significant distance.

Photoreceptor materials comprising inorganic or organic materials wherein the charge generating and charge transport functions are performed by discrete contiguous layers are also known. Additionally, layered photoreceptor members are disclosed in the prior art, including photoreceptors having an overcoat layer of an electrically insulating polymeric material. Other layered photoresponsive devices have been disclosed, including those comprising separate photogenerating layers and charge transport layers as described in U.S. Pat. No. 4,265,990, the disclosure of which is totally incorporated herein by reference. Photoresponsive materials containing a hole injecting layer overcoated with a hole transport layer, followed by an overcoating of a photogenerating layer, and a top coating of an insulating organic resin, are disclosed in U.S. Pat. No. 4,251,612, the disclosure of which is totally incorporated herein by reference. Examples of photogenerating layers disclosed in these patents include trigonal selenium and phthalocyanines, while examples of transport layers include certain aryl diamines as illustrated therein.

U.S. Pat. No. 3,574,181 discloses disazo compounds useful as coloring agents. Composite electrophotographic photosensitve materials containing various azo compounds are disclosed in U.S. Pat. No. 4,618,672, wherein bisazo compounds particularly suitable for use in the charge generating layer of a layered electrophotographic photoconductor are illustrated. Similarly, an article by M. Hashimoto entitled "Electrophotographic Sensitivity of Fluorenone Bisazo Pigments", *Electrophotography*, Vol. 25, No. 3 (1986), discloses disazo compounds as charge generating materials in electrophotographic layered photoreceptors. Further, Japanese Patent Kokai No. 54-20736 discloses disazo pigments as constituents in electrophotographic processes. Japanese Patent 58-177955 also discloses many disazo compounds suitable for use in the photosensitive layer of an electrophotographic device.

U.S. Pat. No. 4,713,307, the disclosure of which is hereby totally incorporated by reference, also discloses photoconductive imaging members containing a supporting substrate, certain azo pigments as photogenerating materials, and a hole transport layer that preferably contains an aryl diamine compound dispersed in an inactive resinous binder.

U.S. Pat. No. 4,797,337, the disclosure of which is totally incorporated herein by reference, discloses a photoconductive imaging member comprising a supporting substrate, a hole transport layer, and a photogenerating layer comprising specific disazo compounds.

Documents illustrating layered organic electrophotographic photoconductor elements with azo, bisazo, and related compounds include U.S. Pat. Nos. 4,390,611, 4,551,404, 4,596,754, Japanese Patent 60-64354, U.S. Pat. Nos. 4,400,455, 4,390,608, 4,327,168, 4,299,896, 4,314,015, 4,486,522, 4,486,519, 4,555,667, 4,440,845, 4,486,800, 4,309,611, 4,418,133, 4,293,628, 4,427,753, 4,495,264, 4,359,513, 3,898,084, 4,830,944, 4,820,602, and 3,898,084; *Electrophotography*, K. Ota, 25, 30, 303, (1986), Japanese 62-139308 (1987), and Japanese Patent Publication 60-111247. With the invention of the present application there are selected for the imaging members certain fluorinated trisazo photogenerating pigments obtained from tris(p-aminophenyl)amine and carbazole couplers, which pigments are sensitive to wavelengths of light of from about 400 to about 800 nanometers, thereby permitting the photoconductive imaging members with these pigments to be selected for infrared printers, LED printers, and electrophotographic imaging processes, and the like.

U.S. Pat. No. 4,424,266 discloses an electrophotographic photosensitive element having a conductive support and a photosensitive layer comprising a carrier generating phase layer containing a carrier generating material selected from the group consisting of perylene dyes, polycyclic quinones, and azo dyes, and a carrier transporting phase layer containing a hydrazone carrier transporting material. The carrier generator materials can be used either singly or in combination.

Japanese Patent Publication J01-198-763 discloses an electrophotographic photoreceptor containing a bisazo series compound in a photosensitive layer formed on a conductive support. A charge transport material is used with the bisazo pigment as a charge generation material, such as 2,4,7-trinitrofluorenone, tetracyanoquinodimethane, carbazole, triarylalkane derivatives, phenylenediamine derivatives, hydrazone compounds, or stilbene derivatives.

In a patentability search report there are recited the following U.S. Pat. Nos. 4,507,471 which discloses certain trisazo compounds, see column 2 for example, which compounds can be used for developing charge carrier generating compounds which are highly sensitive and have a uniform sensitivity throughout the visible region; and 4,916,039 and 4,925,758 which disclose a photoconductive layer comprising the azo pigments as illustrated, for example, in column 3; also disclosed as a starting material for preparing the azo pigments is a 2-hydroxy-3-carbamoylbenzo(a)carbazole derivative.

There is illustrated in U.S. Pat. No. 5,175,258, a process for the preparation of bisazo photogenerating pigments which comprises the reaction of diaminofluorenone with sodium nitrite, hydrochloric acid, and fluoroboric acid; thereafter reacting the resulting product with an anilide coupler; and subsequently annealing the product obtained; U.S. Pat. No. 5,139,910 bisazo compounds essentially as represented by the formula of FIG. 9 wherein Cp is an azoic coupler such as 2-hydroxy-3-naphtho-o-methoxyanilide; 2-hydroxy-3-naphtho-p-methoxyanilide; 2-hydroxy-3-naphtho-p-trifluoromethylanilide; 2-hydroxy-3-naphtho-o-methylanilide; 2-hydroxy-3-naphtho-p-chloroanilide; 2-hydroxy-3-naphtho-p-methylanilide; 2-hydroxy-3-naphtho-p-fluoroanilide; 2-hydroxy-3-naphtho-o-chloroanilide; 2-hydroxy-3-naphtho-m-trifluoromethylanilide; 2-hydroxy-3-naphtho-p-nitroanilide; 2-hydroxy-3-naphtho-o-ethylanilide; 2-hydroxy-3-naphtho-o-fluoroanilide; 2-hydroxy-3-naphtho-p-bromoanilide; and the like, and photoconductive imaging members thereof; and U.S. Pat. No. 5,130,443. The disclosures of each of the aforementioned patents are totally incorporated herein by reference.

Although the prior art imaging members are suitable for their intended purposes, a need remains for imaging members containing certain trisazo materials. In addition, a need exists for imaging members containing photoconductive materials with improved photoconductivity. There is also a need for imaging members with photoconductive materials comprised of fluorinated trisazo photogenerating pigments, wherein the material has enhanced dispersability in polymers and solvents. Further, there is a need for photoconductive materials with enhanced dispersability in polymers and solvents that enable low cost coating processes in the manufacture of photoconductive imaging members. Additionally, there is a need for photoconductive materials that enable imaging members with enhanced photosensitivity in the red and infrared wavelength regions of the light spectrum enabling the resulting imaging members thereof to be selected for LED xerographic imaging processes and printers, and diode laser printer and imaging apparatuses. There remains a need for trisazo compounds for improved xerographic performance. The fluorinated trisazo pigments of the present invention described herein are directed toward achieving these needs.

SUMMARY OF THE INVENTION

It is a feature of the present invention to provide imaging members with many of the advantages illustrated herein.

It is another feature of the present invention to provide imaging members with photoconductive materials with improved photoconductivity.

It is another feature of the present invention to provide photoconductive imaging members with certain fluorinated trisazo photogenerating pigments that enable imaging members with enhanced photosensitivity from the visible to the infrared wavelength regions of the light spectrum, such as from about 400 to about 800 nanometers.

In one embodiment of the present invention, there are provided layered imaging members with fluorinated trisazo photogenerating pigments. One embodiment of the present invention is directed to layered imaging members comprised of supporting substrate, a photogenerating layer comprised of photogenerating pigments comprised of the fluorinated trisazo compounds represented, or essentially represented by the formulas provided herein, and thereover a charge transport layer.

BRIEF DESCRIPTION OF THE FIGURES

Additional compound, experimental data and the like are contained in Appendices I through IV.

DETAILED DESCRIPTION OF THE FIGURES

Figures 3, 4:
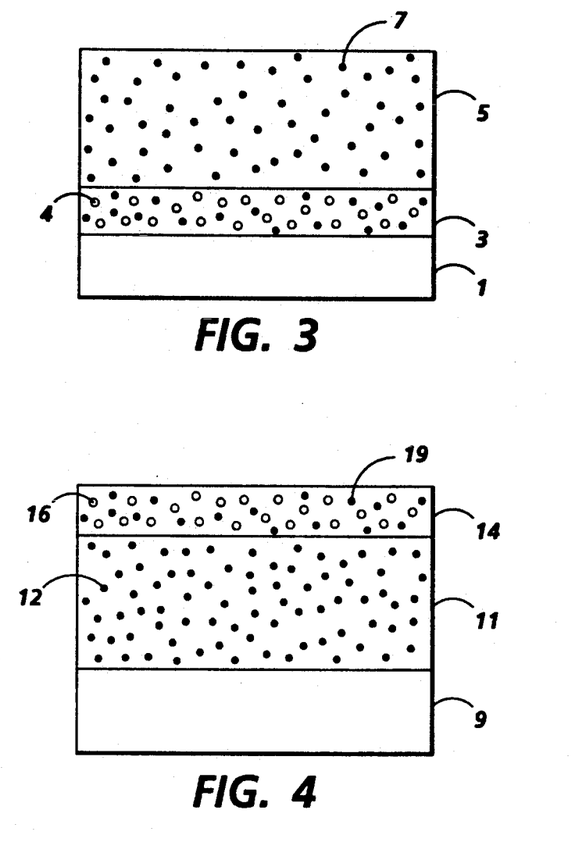
FIGS. 3, 4, and 5 represent schematic cross-sectional views of examples of photoconductive imaging members of the present invention.

FIG. 3 illustrates schematically one embodiment of the imaging members of the present invention. Specifically, FIG. 3 illustrates a photoconductive imaging member comprising a conductive substrate 1, a photogenerating layer 3 comprising a trisazo photogenerating pigment represented by FIG. 1, optionally dispersed in a resinous binder composition 4, and a charge transport layer 5, which comprises charge transporting molecules dispersed in an inactive resinous binder composition 7.

FIG. 4 illustrates schematically essentially the same member as that shown in FIG. 3 with the exception that the transport layer is situated between the conductive substrate and the photogenerating layer. More specifically, this Figure illustrates a photoconductive imaging member comprising a conductive substrate 9, a hole transport layer 11 comprising a hole transport composition, such as an aryl amine, dispersed in an inactive resinous binder composition 12, and a photogenerating layer 14 comprising one of, or a mixture of the trisazo photogenerating pigments 16 represented by FIG. 1, especially those of Appendix II, optionally dispersed in a resinous binder composition 19.

Figure 1:
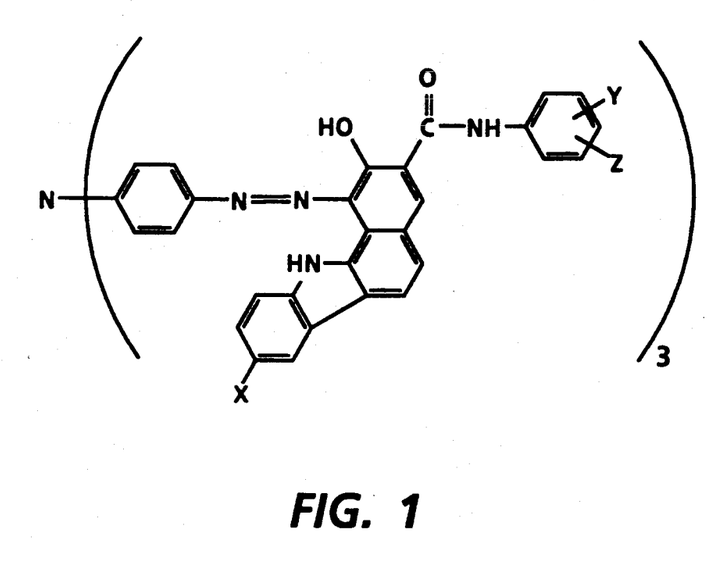
FIG. 1 is a general formula representing the trisazo photogenerating pigments of the present invention, wherein X is halogen, such as chloride or fluoride, and the other substituents are as illustrated herein. Specific examples of trisazo compounds include those wherein Y and Z may be independently selected from the group consisting of H, F, Cl, Br, alkyl with, for example, from 1 to about 25 carbon atoms, such as methyl, ethyl, propyl, butyl, pentyl, hexyl, heptyl, octyl, nonyl, and the like, $CF_3$, $NO_2$, alkoxy, with, for example, from 1 to about 25 carbon atoms, such as $OCH_3$, $OC_2H_5$, and the like, and hydroxy OH, in the anilide coupler moiety, and wherein when X is chlorine or fluorine, and at least one of the substituents X, Y and Z is F or $CF_3$; and Compound 3 of FIG. 2 represents compound encompassed by the formula of FIG. 1 wherein the substituents X, Y, and Z are as shown in Appendix III, Table III.
Figure 5:
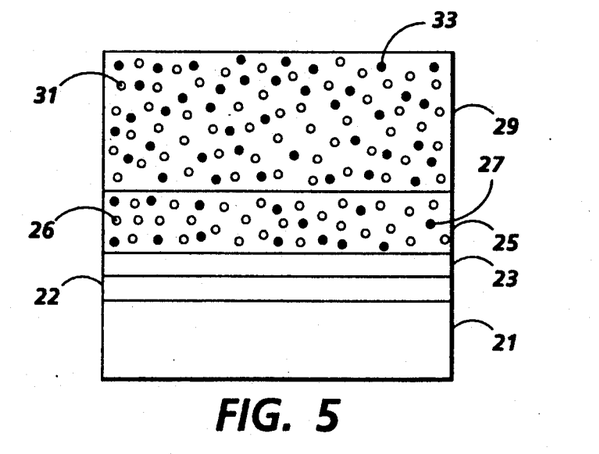

FIG. 5 illustrates schematically a photoconductive imaging member of the present invention comprising a conductive substrate 21, a hole blocking metal oxide layer 22, an optional adhesive layer 23, a photogenerating layer 25 comprised of a trisazo photogenerating pigment 26 as essentially represented by the formula of FIG. 1 or mixtures thereof, optionally dispersed in a resinous binder composition 27, and an aryl amine hole transport layer 29 comprising aryl amine hole transport molecules 31 optionally dispersed in a resinous binder 33.

The substrate can be formulated entirely of an electrically conductive material, or it can be an insulating material having an electrically conductive surface. The substrate is of an effective thickness, generally up to about 100 mils, and preferably from about 1 to about 50 mils, although the thickness can be outside of this range. The thickness of the substrate layer depends on many factors, including economic and mechanical considerations. Thus, this layer may be of substantial thickness, for example over 100 mils, or of minimal thickness provided that there are no adverse effects on the system. In one embodiment, the thickness of this layer is from about 3 mils to about 10 mils. The substrate can be opaque or substantially transparent and can comprise numerous suitable materials having the desired mechanical properties. The entire substrate can comprise the same material as that in the electrically conductive surface or the electrically conductive surface can merely be a coating on the substrate. Any suitable electrically conductive material can be employed. Typical electrically conductive materials include copper, brass, nickel, zinc, chromium, stainless steel, conductive plastics and rubbers, aluminum, semi transparent aluminum, steel, cadmium, titanium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The substrate layer can vary in thickness over substantially wide ranges depending on the desired use of the electrophotoconductive member. Generally, the conductive layer ranges in thickness from about 50 Angstroms to many centimeters, although the thickness can be outside of this range. When a flexible electrophotographic imaging member is desired, the thickness typically is from about 100 Angstroms to about 750 Angstroms. The substrate can be of any other conventional material, including organic and inorganic materials. Typical substrate materials include insulating nonconducting materials such as various resins known for this purpose including polycarbonates, polyamides, polyurethanes, paper, glass, plastic, polyesters such as MYLAR ® (available from DuPont) or MELINEX 447 ® (available from ICI Americas, Inc.), and the like. If desired, a conductive substrate can be coated onto an insulating material. In addition, the substrate can comprise a metallized plastic, such as titanized or aluminized MYLAR ®, wherein the metallized surface is in contact with the photogenerating layer or any other layer situated between the substrate and the photogenerating layer. The coated or uncoated substrate can be flexible or rigid, and can have any number of configurations, such as a plate, a cylindrical drum, a scroll, an endless flexible belt, or the like. The outer surface of the substrate preferably comprises a metal oxide such as aluminum oxide, nickel oxide, titanium oxide, and the like.

In embodiments, intermediate adhesive layers between the substrate and subsequently applied layers may be desirable to improve adhesion. If such adhesive layers are utilized, they preferably have a dry thickness of from about 0.1 micron to about 5 microns, although the thickness can be outside of this range. Typical adhesive layers include filmforming polymers such as polyester, polyvinylbutyral, polyvinylpyrolidone, polycarbonate, polyurethane, polymethylmethacrylate, and the like as well as mixtures thereof. Since the surface of the substrate can be a metal oxide layer or an adhesive layer, the expression "substrate" as employed herein is intended to include a metal oxide layer with or without an adhesive layer on a metal oxide layer.

The photogenerating layer is of an effective thickness, for example a thickness of from about 0.05 micron to about 10 microns or more, and in embodiments has a thickness of from about 0.1 micron to about 3 microns. The thickness of this layer, however, is dependent primarily upon the concentration of photogenerating material in the layer, which may generally vary from about 5 to 100 percent. When the photogenerating material is present in a binder material, the binder preferably contains from about 30 to about 95 percent by weight of the photogenerating material, and preferably contains about 80 percent by weight of the photogenerating material. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, such as the specific photogenerating compound selected, the thicknesses of the other layers, and whether a flexible photoconductive imaging member is desired.

Charge transport layers are well known in the art. Typical transport layers are described, for example, in U.S. Pat. Nos. 4,265,990; 4,609,605; 4,297,424 and 4,921,773, the disclosures of each of these patents being totally incorporated herein by reference. Organic charge transport materials can be employed. Typical charge, especially hole transporting materials, include in embodiments the following:

Hole transport molecules of the type described in U.S. Pat. Nos. 4,306,008; 4,304,829; 4,233,384; 4,115,116; 4,299,897 and 4,081,274, and U.S. Pat. No. 5,139,910 the disclosures of each of which are totally incorporated herein by reference, can be selected for the imaging members of the present invention. Typical diamine hole transport molecules include N,N'-diphenyl-N,N'-bis(3-methylphenyl)-(1,1'-biphenyl)-4,4'-diamine, N,N'-diphenyl-N,N'-bis(4-methylphenyl)-(1,1'-biphenyl)-4,4'-diamine, N,N'-diphenyl-N,N'-bis(2-methylphenyl)-(1,1'-biphenyl)-4,4'-diamine, N,N'-diphenyl-N,N'-bis(3-ethylphenyl)-(1,1'-biphenyl)-4,4'-diamine, N,N'-diphenyl-N,N'-bis(4-ethylphenyl)-(1,1'-biphenyl)-4,4'-diamine, N,N'-diphenyl-N,N'-bis(4-n-butylphenyl)-(1,1'-biphenyl)-4,4'-diamine, N,N'-diphenyl-N,N'-bis(3-chlorophenyl)-[1,1'-biphenyl]-4,4'-diamine, N,N'-diphenyl-N,N'-bis(4-chlorophenyl)-[1,1'-biphenyl]-4,4'-diamine, N,N'-diphenyl-N,N'-bis(phenylmethyl)-[1,1'-biphenyl]-4,4'-diamine, N,N,N',N'-tetraphenyl-[2,2'-dimethyl-1,1'-biphenyl]-4,4'-diamine, N,N,N',N'-tetra-(4-methylphenyl)-[2,2'-dimethyl-1,1'-biphenyl]-4,4'-diamine, N,N'-diphenyl-N,N'-bis(2-methylphenyl)-[2,2'-dimethyl-1,1'-biphenyl]-4,4'-diamine, N,N'-diphenyl-N,N'-bis(2-methylphenyl)-[2,2'-dimethyl-1,1'-biphenyl)9 -4,4'-diamine, N,N'-diphenyl-N,N'-bis(3-methylphenyl)-[2,2'-dimethyl-1,1'- biphenyl]-4,4'-diamine, N,N'-diphenyl-N,N'-bis(3-methylphenyl)-pyrenyl-1,6-diamine, and the like.

Pyrazoline transport molecules as disclosed in U.S. Pat. Nos. 4,315,982; 4,278,746 and 3,837,851, the disclosures of each of which are totally incorporated herein by reference, can also be selected. Typical pyrazoline transport molecules include 1-[lepidyl-(2)]-3-(p-diethylaminophenyl)-5-(p-diethylaminophenyl)pyrazoline, 1-[quinolyl-(2)]-3-(p-diethylaminophenyl)-5-(p-diethylaminophenyl)pyrazoline, 1-[pyridyl-(2)]-3-(p-diethylaminostyryl)-5-(p-diethylaminophenyl)pyrazoline, 1-[6-methoxypyridyl-(2)]-3-(p-diethylaminostyryl)-5-(p-diethylaminophenyl) pyrazoline, 1-phenyl-3-[p-dimethylaminostyryl]-5-(p-dimethylaminostyryl)-pyrazoline, 1-phenyl-3-[p-diethylaminostyryl]-5-(p-diethylaminostyryl)pyrazoline, and the like.

Substituted fluorene charge transport molecules as described in U.S. Pat. No. 4,245,021, the disclosure of which is totally incorporated herein by reference can also be selected. Typical fluorene charge transport molecules include 9-(4'-dimethylaminobenzylidene)fluorene, 9-(4'-methoxybenzylidene)fluorene, 9-(2',4'-dimethoxybenzylidene)fluorene, 2-nitro-9-benzylidene-fluorene, 2-nitro-9-(4'-diethylaminobenzylidene)fluorene, and the like.

Oxadiazole transport molecules such as 2,5-bis(4-diethylaminophenyl)-1,3,4-oxadiazole, pyrazoline, imidazole, triazole, and the like can also be selected. Other typical oxadiazole transport molecules are described, for example, in German Patents 1,058,836; 1,060,260 and 1,120,875, the disclosures of each of which are totally incorporated herein by reference.

Other specific hole transports include hydrazone transport molecules, such as p-diethylamino benzaldehyde-(diphenylhydrazone), o-ethoxy-p-diethylaminobenzaldehyde-(diphenylhydrazone), o-methyl-p-diethylaminobenzaldehyde-(diphenylhydrazone), o-methyl-p-dimethylaminobenzaldehyde-(diphenylhydrazone), 1-naphthalenecarbaldehyde 1-methyl-1-phenylhydrazone, 1-naphthalenecarbaldehyde 1,1-phenylhydrazone, 4-methoxynaphthlene-1-carbaldehyde 1-methyl-1-phenylhydrazone, and the like. Other typical hydrazone transport molecules are described, for example, in U.S. Pat. Nos. 4,150,987; 4,385,106; 4,338,388 and 4,387,147, the disclosures of each of which are totally incorporated herein by reference; carbazole phenyl hydrazone transport molecules such as 9-methylcarbazole-3-carbaldehyde-1,1-diphenylhydrazone, 9-ethylcarbazole-3-carbaldehyde-1-methyl-1-phenylhydrazone, 9-ethylcarbazole-3-carbaldehyde-1-ethyl-1-phenylhydrazone, 9-ethylcarbazole-3-carbaldehyde-1-ethyl-1-benzyl-1-phenylhydrazone, 9-ethylcarbazole-3-carbaldehyde-1,1-diphenylhydrazone, and the like, such as those described in U.S. Pat. Nos. 4,256,821 and 4,297,426, the disclosures of each of which are totally incorporated herein by reference; vinyl-aromatic polymers such as polyvinyl anthracene, polyacenaphthylene; formaldehyde condensation products with various aromatics such as condensates of formaldehyde and 3-bromopyrene; 2,4,7-trinitrofluorenone, and 3,6-dinitro-N-t-butylnaphthalimide as described, for example, in U.S. Pat. No. 3,972,717, the disclosure of which is totally incorporated herein by reference; oxadiazole derivatives such as 2,5-bis-(p-diethylaminophenyl)-oxadiazole-1,3,4 described in U.S. Pat. No. 3,895,944, the disclosure of which is totally incorporated herein by reference; tri-substituted methanes such as alkyl-bis(N,N-dialkylaminoaryl)methane, cycloalkyl-bis(N,N-dialkylaminoaryl)methane, and cycloalkenyl-bis(N,N-dialkylaminoaryl)methane as described in U.S. Pat. No. 3,820,989, the disclosure of which is totally incorporated herein by reference; 9-fluorenylidene methane derivatives having the formula wherein X and Y are cyano groups or alkoxycarbonyl groups, A, B, and W are electron withdrawing groups independently selected from the group consisting of acyl, alkoxycarbonyl, nitro, alkylaminocarbonyl, and derivatives thereof, m is a number of from 0 to 2, and n is the number 0 or 1 as described in U.S. Pat. No. 4,474,865, the disclosure of which is totally incorporated herein by reference; typical 9-fluorenylidene methane derivatives encompassed by the above formula include (4-n-butoxycarbonyl-9-fluorenylidene)-malononitrile, (4-phenethoxycarbonyl-9-flouronylidene)malononitrile, (4-carbitoxy-9-fluorenylidene)malononitrile, (4-n-butoxycarbonyl-2,7-dinitro-9-fluoroenylidene)malonate, and the like; poly-1-vinylpyrene, poly-9-vinylanthracene, poly-9-(4-pentenyl)-carbazole, poly-9-(5-hexyl)-carbazole, polymethylene pyrene, poly-1-(pyrenyl)butadiene, polymers such as alkyl, nitro, amino, halogen, and hydroxy substitute polymers such as poly-3-amino carbazole, 1,3-dibromo-poly-N-vinyl carbazole, 3,6-dibromo-poly-N-vinyl carbazole, and numerous other transparent organic polymeric or nonpolymeric transport materials as described in U.S. Pat. No. 3,870,516, the disclosure of which is totally incorporated herein by reference.

In embodiments of the present invention a preferred hole transport layer is comprised of components as represented, or essentially represented, by the following general formula wherein X, Y and Z are selected from the group consisting of hydrogen, an alkyl group with for example from 1 to about 25 carbon atoms and a halogen preferably chlorine, and at least one of X, Y and Z is independently hydrogen, an alkyl group or chlorine. When Y and Z are hydrogen, the compound may be named N,N'-diphenyl-N,N'-bis(alkylphenyl)-[1,1'-biphenyl]-4,4'-diamine wherein the alkyl is, for example, methyl, ethyl, propyl, n-butyl, or the like, or the compound may be N,N'-diphenyl-N,N'-bis(chlorophenyl)-[1,1'-biphenyl]-4,4'-diamine. Preferred aryl diamine charge transports are illustrated in U.S. Pat. No. 4,265,990, the disclosure of which is totally incorporated herein by reference.

The charge transport material is present in the charge transport layer in an effective amount, generally from about 5 to about 90 percent by weight, preferably from about 20 to about 75 percent by weight, and more preferably from about 30 to about 60 percent by weight, although the amount can be outside of these ranges.

Examples of the highly insulating and transparent resinous components or inactive binder resinous material for the transport layer include materials such as those described in U.S. Pat. No. 3,121,006, the disclosure of which is totally incorporated herein by reference. Specific examples of suitable organic resinous materials include polycarbonates, acrylate polymers, vinyl polymers, cellulose polymers, polyesters, polysiloxanes, polyamides, polyurethanes, polystyrenes, and epoxies as well as block, random or alternating copolymers thereof. Preferred electrically inactive binder materials are polycarbonate resins such as MAKROLON® having a molecular weight of from about 20,000 to about 100,000 with a molecular weight in the range of from about 50,000 to about 100,000 being particularly preferred. Generally, the resinous binder contains from about 5 to about 90 percent by weight of the active material corresponding to the foregoing formula, and preferably from about 20 percent to about 75 percent of this material.

Similar binder materials may be selected for the photogenerating layer, including polyesters, polyvinyl butyrals, polyvinylcarbazole, polycarbonates, polyvinyl formals, poly(vinylacetals) and those illustrated in U.S. Pat. No. 3,121,006, the disclosure of which is totally incorporated herein by reference.

The photoconductive imaging member may optionally contain a charge blocking layer situated between the conductive substrate and the photogenerating layer. This layer may comprise metal oxides, such as aluminum oxide and the like, or materials such as silanes and nylons. Additional examples of suitable materials include polyisobutyl methacrylate, copolymers of styrene and acrylates such as styrene/n-butyl methacrylate, copolymers of styrene and vinyl toluene, polycarbonates, alkyl substituted polystyrenes, styrene-olefin copolymers, polyesters, polyurethanes, polyterpenes, silicone elastomers, mixtures thereof, copolymers thereof, and the like. The primary purpose of this layer is to prevent charge injection from the substrate during and after charging. This layer is of a thickness of less than 50 Angstroms to about 10 microns, preferably being no more than about 2 microns.

In addition, the photoconductive imaging member may also optionally contain an adhesive interface layer situated between the hole blocking layer and the photogenerating layer. This layer may comprise a polymeric material such as polyester, polyvinyl butyral, polyvinyl pyrrolidone and the like. Typically, this layer is of a thickness of less than about 0.6 micron.

Figure 2:
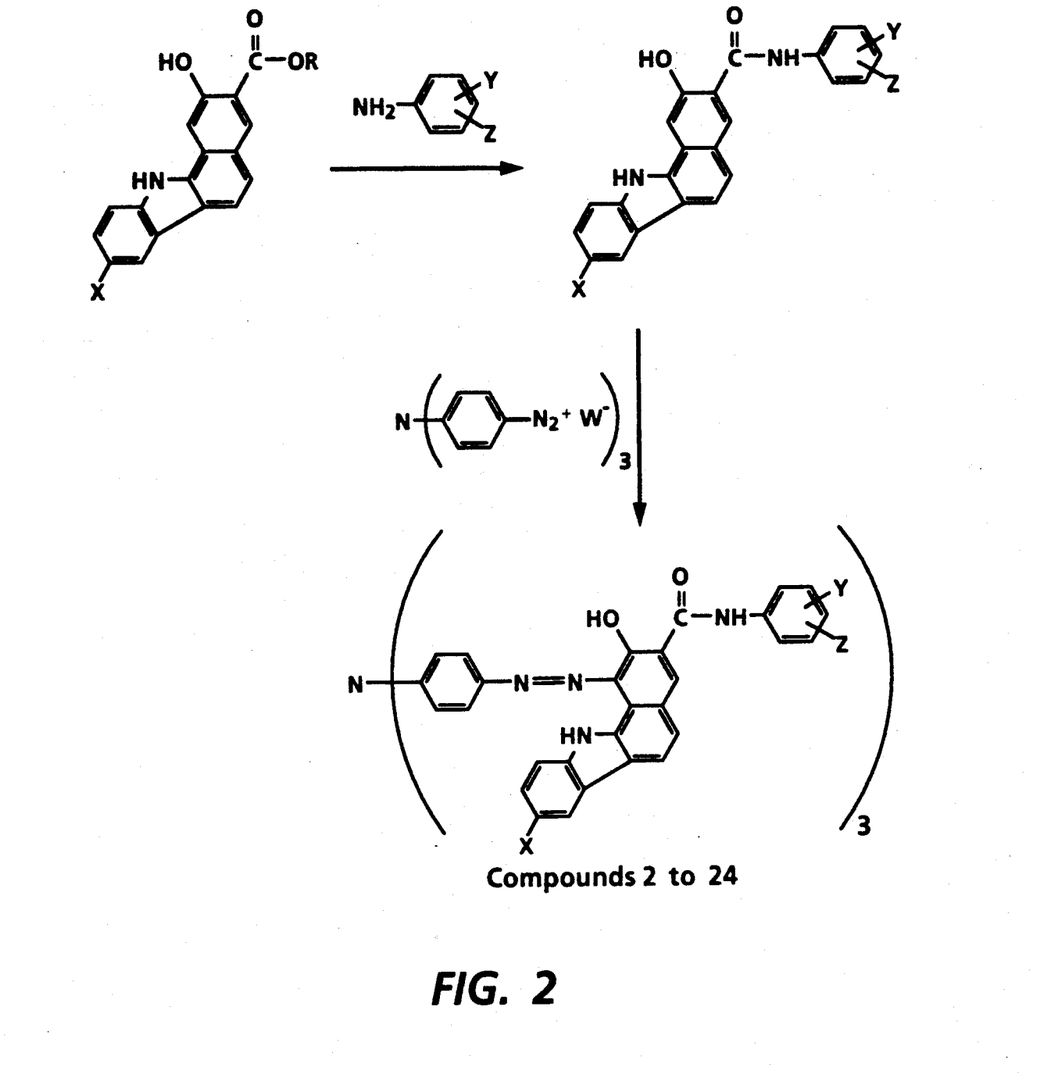
FIG. 2 represents one synthetic reaction scheme used for the preparation of the trisazo photogenerating pigments of the present invention.

The fluorinated trisazo photogenerating pigments of the present invention can be prepared by various suitable processes. One process embodiment as illustrated in FIG. 2, wherein the substituents X, Y and Z are as illustrated herein, and W is a counterion of the diazonium salt, such as for example halogen, like chloride or bromide, involves the reaction of tris(p-aminophenyl)amine with an acid such as hydrochloric acid, an alkali nitrite, such as sodium nitrite, and a precipitating agent, such as fluoroboric acid, followed by isolation of the resulting hexazonium or tris(diazo) salt. The salt can then be dissolved in a solvent, such as cold dimethylformamide containing a naphthanilide, such as 2-hydroxy-8-chloro-11H-benzo(a)carbazole-3-carbox-2'-fluoro-4'-chloroanilide, and thereafter adding an aqueous solution of an alkali, such as sodium, or potassium, acetate, heating, cooling, and isolating the product by, for example, filtration. The resulting fluorinated trisazo product can be identified by melting point data, elemental analysis, infrared, X-ray, and the like. In one embodiment the fluorinated trisazo compound of Formula 2, for example as in Table III, can be prepared by initially azotizing tris(p-aminophenyl)amine, with an excess amount, for example from about 2 to about 10, and preferably from about 2 to about 5 equivalents of a metallic nitrite, such as sodium nitrite, at a temperature of from about $-10°$ to about $30°$ C. in an acid aqueous solution, such as a solution of hydrochloric acid. The resulting hexazonium or tris(diazo) salts formed can be isolated as the tetrafluoroborate or hexafluorophosphate salts by, for example, adding from about 2 to about 50, and preferably from about 10 equivalents of $HBF_4$ or $HPF_6$, to the salt solution. Thereafter, the salt can be dissolved in a solvent, such as dimethylformamide, at a temperature of from about $-10°$ to about $30°$ C., and the mixture resulting is allowed to react with about 3 equivalents or more of an azoic coupler, such as 2-hydroxy-8-chloro-11H-benzo(a)carbazole-3-carbox-2'-fluoro-4'-chloroanilide, at a temperature of from about $-10°$ to about $30°$ C. Subsequently, the desired fluorinated trisazo products are precipitated out of solution by the addition of about 10 equivalents of a base, such as sodium acetate. Thereafter, the fluorinated trisazo can be isolated by known means, such as filtration, and purified by solvent washings if desired. Washing can be accomplished with water for the primary purpose of removing inorganic impurities and followed by washing with dimethylformamide for the purpose of removing any organic impurities. The resulting fluorinated trisazo product can be identified by melting point data, elemental analysis, and infrared spectroscopy.

With respect to the preparation of the fluorinated trisazo compounds 3 to 24 the above process can be repeated with the exceptions that there are selected as couplers 2-hydroxy-8-chloro-11H-benzo(a)carbazole-3-carbox-m-fluoranilide; 2-hydroxy-8-chloro-11H-benzo(a)carbazole-3-carbox-o-fluoranilide; 2-hydroxy-8-chloro-11H-benzo(a)carbazole-3-carbox-3'-chloro-4'-fluoroanilide; 2-hydroxy-8-chloro-11H-benzo(a)carbazole-3-carbox-2'-fluoro-4'-chloroanilide; 2-hydroxy-8-chloro-11H-benzo(a)carbazole-3-carbox-2',4'-difluoroanilide; 2-hydroxy-8-chloro-11H-benzo(a)carbazole-3-carbox-3',5'-difluoroanilide; 2-hydroxy-8-fluoro-11H-benzo(a)carbazole-3-carbox-anilide; 2-hydroxy-8-fluoro-11H-benzo(a)carbazole-3-carbox-p-fluoroanilide; 2-hydroxy-8-fluoro-11H-benzo(a)carbazole-3-carbox-p-chloroanilide; 2-hydroxy-11H-benzo(a)carbazole-3-carbox-p-fluoroanilide; or 2-hydroxy-11H-benzo(a)carbazole-3-carbox-m-trifluoromethylanilide.

The photogenerating compounds of the present invention in embodiments thereof enable enhanced photosensitivity in the infrared wavelength range. In particular, imaging members with photosensitivity at wavelengths of up to about 800 nanometers are provided in embodiments of the present invention, which renders them particularly useful for imaging and printing applications such as LED and diode laser printing processes, which typically require sensitivity of about 600 to about 800 nanometers.

The present invention also encompasses a method of generating images with the photoconductive imaging members disclosed herein. The method comprises the steps of generating an electrostatic latent image on a photoconductive imaging member of the present invention, developing the latent image, and transferring the developed electrostatic image to a substrate. Optionally, the transferred image can be permanently affixed to the substrate. Development of the image may be achieved by a number of methods, such as cascade, touchdown, powder cloud, magnetic brush, and the like. Transfer of the developed image to a substrate may be by any method, including those making use of a corotron or a biased roll. The fixing step may be performed by means of any suitable method, such as flash fusing, heat fusing, pressure fusing, vapor fusing, and the like. Any material used in xerographic copiers and printers may be used as a substrate, such as paper, transparency material, or the like.

In embodiments, the present invention is directed to an imaging member comprised of a supporting substrate, a photogenerator layer comprised of a fluorinated trisazo pigment or pigments as essentially represented by the formula wherein X is halogen, and Y and Z are selected from the group consisting of H, F, Cl, Br, alkyl, $CF_3$, $NO_2$, alkoxy, and OH, and wherein at least one of the substituents X, Y and Z is F or $CF_3$; and a charge transport layer.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Phenyl 2-hydroxy-8-chloro-11-benzo(a)carbazole-3-carboxylate, 25 grams, (64.5 millimoles), 2-fluoro-4-chloroaniline (56.2 grams, 387 millimoles), and 10 milliliters of N-methyl pyrrolidinone were charged into a 100 milliliter 3-necked flask equipped with a magnetic stirrer and a nitrogen inlet. The resulting mixture was then stirred and heated to reflux at an oil bath temperature of about 250° C. under a nitrogen atmosphere for 8 hours. TLC (thin layer chromatography) analysis revealed that all the starting phenyl ester reactant was consumed. Thereafter, the resulting mixture was cooled to about 25° C., and 50 milliliters of DMF (dimethyl formamide) was introduced. The resulting mixture was then discharged into a 2 liter beaker containing about 700 milliliters of ice cold 5 percent hydrochloric acid. There resulted a yellow precipitate which was isolated by filtration. After washing the product with about 100 milliliters of methanol, 27.2 grams of crude product was obtained. The product was then recrystallized from a mixture of DMF (300 milliliters), methanol (300 milliliters) and water (20 milliliters), yielding after separation 22.3 grams (78 percent yield) of a yellow solid, which was identified as 2-hydroxy-8-chloro-11H-benzo(a)carbazole-3-carbox-2'-fluoro-4'-chloroanilide, m.p. >310° C. and IR (KBr): 3,340 and 3,450 (N-H) and 1,660 (ester C=O).

Calculated for $C_{23}H_{13}N_2Cl_2F$: C, 62.89; H, 2.98; N, 6.38. Found: C, 62.80; H, 3.08; N, 6.41.

EXAMPLE II 2-hydroxy-8-fluoro-11H-benzo(a)carbazole-3-carbox-2'-fluoro-4'-chloroanilide was prepared by reacting phenyl 2-hydroxy-8-fluoro-11H-benzo(a)carbazole-3-carboxylate and 2-fluoro-4-chloroaniline. Initially, 2-hydroxy-8-fluoro-11H-benzo(a)carbazole-3-carboxylic acid (30.0 grams, 0.1 mole), phenol (47.8 grams, 0.5 mole) and 90 milliliters of xylene were charged in a 500 milliliter 3-neck flask equipped with a magnetic stirrer, a reflux condenser and a nitrogen inlet. The resulting mixture was stirred under a nitrogen atmosphere, followed by heating to reflux at an oil bath temperature of about 160° C.. Phosphorous oxychloride (17.8 grams) was then added through a pressure equalizing funnel slowly in about 10 minutes. After the addition was completed, the mixture was maintained at reflux for another four hours. TLC analysis revealed that all the starting acid was consumed. The product mixture was cooled to room temperature and about 50 milliliters of methanol were introduced therein. The resulting mixture was then chilled in an ice water bath for 1 hour, and the solid product was isolated by filtration. After washing with methanol (about 50 milliliters) and vacuum drying, a yellow solid (about 36 grams) was obtained. The crude product was then dissolved in about 200 milliliters of hot acetone through a Soxhlet extractor. After removal of the acetone on an evaporator, 35 grams (93 percent) of purified phenyl-2hydroxy-8-fluoro-11H-benzo(a)carbazole-3-carboxylate were obtained, m.p. 289° to 290° C., and IR(KBr): 3,364 (N-H) and 1,681 cm$^{-1}$(ester C=O).

Calculated for $C_{23}H_{14}NO_3F$: C,74.39; H, 3.80; N, 3.77.

Found: C, 73.50; H, 4.13; N, 3.76.

The phenyl 2-hydroxy-8-fluoro-11H-benzo(a)carbazole-3-carboxylate (6 grams, 16.2 millimoles), 2-fluoro-4-chloroaniline (14.1 grams, 97.2 millimoles) and 5 milliliters of N-methyl pyrrolidinone were charged into a 100 milliliter 3-neck flask equipped with a magnetic stirrer and a nitrogen inlet. The resulting mixture was stirred and was heated to reflux at an oil bath temperature of about 250° C. under a nitrogen atmosphere. After 16 hours, TLC analysis revealed that all the starting phenyl ester was consumed. The mixture was cooled to room temperature and poured into a 750 milliliter beaker containing 200 milliliters of 5 percent aqueous HCl. The resulting yellow precipitate was isolated by filtration. After washing with methanol (about 10 milliliters) and ether (about 10 milliliters), 7.26 grams of crude product were obtained. The crude product was then recrystallized from a mixture of DMF/CH$_3$OH/H$_2$O yielding 5.3 grams (77 percent) of a yellow solid, which was subsequently identified as 2-hydroxy-8-fluoro-11H-benzo(a)carbazole-3-carbox-2'-fluoro-4'-chloronanilide, m.p. >300° C., and IR(KBr): 3,460 (N-H) and 1,657 cm$^{-1}$ (amide C=O).

Calculated for C$_{23}$H$_{13}$N$_2$O$_2$F$_2$Cl: C, 65.33; H, 3.10; N, 6.62. Found: C, 65.48; H, 3.02; N, 6.58.

EXAMPLE III

A number of anilides of 2-hydroxy-8-chloro-11H-benzo(a)carbazole-3-carboxylic acid and 2-hydroxy-8-fluoro-11H-benzo(a)carbazole-3-carboxylic acid were prepared by repeating substantially the process of Example I or II. Phenyl ester reactants selected were phenyl 2-hydroxy-8-chloro-11H-benzo(a)carbazole-3-carboxylate and phenyl 2-hydroxy-8-fluoro-11H-benzo(a)carbazole-3-carboxylate. Aniline reactants selected were p-fluoroaniline, m-trifluoromethylaniline, o-fluoroaniline, m-fluoroaniline, 3-chloro-4-fluoroaniline, 3,5-difluoroaniline, 2,4-difluoroaniline, 2,3-difluoroaniline, aniline, p-chloroaniline, o-ethylaniline, 2,4-dichloroaniline, 2-chloro-4-methylaniline, m-nitroaniline, 2-methyl-4-fluoroaniline, 2-chloro-4-fluoroaniline and 2-methyl-4-chloroaniline. The synthetic yields and physical characteristics of these anilide products are provided in Appendix I, Table I. With further respect to the above reactions, the phenyl 2-hydroxy-8-chloro-11H-benzo(a)carbazole-3-carboxylate was reacted with p-fluoroaniline, m-trifluoromethylaniline, o-fluoroaniline, m-fluoroaniline, 3-chloro-4-fluoroaniline, 3,5-difluoroaniline, 2,4-difluoroaniline, and 2,3-difluoroaniline; and the phenyl 2-hydroxy-8-fluoro-11H-benzo(a)carbazole-carboxylate was reacted with aniline, p-chloroaniline, o-ethylaniline, p-fluoroaniline, 2,4-difluoroaniline, 2,4-dichloroaniline, 2-chloro-4-methylaniline, m-trifluoromethylaniline, 3-chloro-4-fluoroaniline, m-nitroaniline, 2-methyl-4-fluoroaniline, 2-chloro-4-fluoroaniline and 2-methyl-4-chloroaniline to provide the products as illustrated herein.

EXAMPLE IV

Tris(4-aminophenyl)amine (0.58 gram, 2 millimoles) was stirred in an aqueous solution containing 14 milliliters of 18 percent hydrochloric acid at about 60° C. for 1 hour and then 16 hours at room temperature. The dispersion obtained was then cooled to 0° to 5° C. by an ice-water bath. A cold aqueous solution of sodium nitrite (0.6 gram in 1.5 milliliters) was added dropwise. After the addition, the resulting mixture was stirred in an ice bath for another 30 minutes. A clear brown solution resulted. The dark brown solution was filtered (by a medium sintered glass funnel) into a 250 milliliter pre-cooled filtration flask. Fluoroboric acid (5 milliliters) was added to the cold filtrate and a yellow precipitate was formed. This mixture was stirred at ice-cold temperature for another 30 minutes. The yellow precipitate was collected by filtration. After washing with cold water, cold methanol and ether, about 1.25 grams of a tris(diazonium)salt was obtained after drying, IR(KBr): 3,118 (C-H) and 2,300 cm$^{-1}$ (—N≡N).

The tris(diazonium)salt was dissolved in about 30 milliliters of cold DMF in a 1 liter 3-neck flask, which was surrounded by an ice-water bath. A cold DMF solution containing 2.91 grams (6.6 millimoles) of 2-hydroxy-8-chloro-11H-benzo(a)carbazole-3-carbox-2'-fluoro-4'-chloroanilide, prepared as in Example I, in about 120 milliliters of DMF was added into the salt solution. A cold aqueous solution of 3 grams of NaOAc in 45 milliliters of water was added in 30 minutes. The temperature of the DMF solution was kept below 7° C. during the addition. After the addition was completed, the ice bath was removed and the product was stirred at room temperature for 16 hours. Crude pigment was isolated by filtration (fine sintered glass funnel). The crude product was then purified by washing with warm water (2×250 milliliters at 80° C.), warm DMF (3×250 milliliters at 80° C.), acetone and ether, yielding a dark blue pigment, which was identified as tris[4-(1'-azo-2'-hydroxy-8'-chloro-11'H-benzo(a)carbazole-3'-carbox-2"-fluoro-4"-chloroanilide)phenyl]amine, compound encompassed by Formula 2, whereas X and Z are Cl and Y is F, yield 2.0 grams (61 percent), m.p.>310° C. and IR(KBr): 1,677 and 1,685 cm$^{-1}$ (amide C=O).

Calculated for C$_{87}$H$_{48}$N$_{13}$O$_6$Cl$_6$F$_3$: C, 63.67; H, 2.95; N, 11.10, Found: C, 63.27; H, 3.39; N, 11.12.

EXAMPLE V

The fluorinated trisazo pigments, Compounds 3 to 24 of Table II, were prepared by repeating the process of Example IV with each of the azoic anilide couplers respectively selected from Appendix I, Table I, wherein in place of the coupler 2-hydroxy-8-chloro-11H-benzo(a)carbazole-3-carbox-2'-fluoro-4'-chloroanilide, there was selected, respectively, 2-hydroxy-8-chloro-11H-benzo(a)carbazole-3-carbox-p-fluoroanilide, 2-hydroxy-8-chloro-11H-benzo(a)carbazole-3-carbox-m-trifluoromethylanilide, 2-hydroxy-8-chloro-11H-benzo(a)carbazole-3-carbox-o-fluoroanilide, 2-hydroxy-8-chloro-11H-benzo(a)carbazole-3-carbox-m-fluoroanilide, 2-hydroxy-8-chloro-11H-benzo(a)carbazole-3-carbox-3'-chloro-4'-fluoroanilide, 2-hydroxy-8-chloro-11H-benzo(a)carbazole-3-carbox-3',5'-difluoroanilide, 2-hydroxy-8-chloro-11H-benzo(a)carbazole-3-carbox-2',4'-difluoroanilide, 2-hydroxy-8-chloro-11H-benzo(a)carbazole-3-carbox-2',3'-difluoroanilide, 2-hydroxy-8-fluoro-11H-benzo(a)carbazole-3-carbox-anilide, 2-hydroxy-8-fluoro-11H-benzo(a)carbazole-3-carbox-p-chloroanilide, 2-hydroxy-8-fluoro-11H-benzo(a)carbazole-3-carbox-o-ethylanilide, 2-hydroxy-8-fluoro-11H-benzo(a)carbazole-3-carbox-p-fluoroanilide, 2-hydroxy-8-fluoro-11H-benzo(a)carbazole-3-carbox-2'-fluoro-4'-chloroanilide, 2-hydroxy-8-fluoro-11H-benzo(a)carbazole-3-carbox-2',4'-difluoroanilide, 2-hydroxy-8-fluoro-11H-benzo(a)carbazole-3-carbox-2',4'-dichloroanilide, 2-hydroxy-8-fluoro-11H-benzo(a)carbazole-3-carbox-2'-chloro-4'-methylanilide, 2-hydroxy-8-fluoro-11H-benzo(a)carbazole-3-carbox-m-trifluoromethylanilide, 2-hydroxy-8-fluoro-11H-benzo(a)carbazole-3-carbox-3'-chloro-4'-fluoroanilide, 2-hydroxy-8-fluoro-11H-benzo(a)carbazole-3-carbox-m-nitroanilide, 2-hydroxy-8-fluoro-11H-benzo(a)carbazole-3-carbox-2'-methyl-4'-fluoroanilide, 2-hydroxy-8-fluoro-11H-benzo(a)carbazole-3-carbox-2'-chloro-4'-fluoroanilide, and 2-hydroxy-8-fluoro-11H-benzo(a)carbazole-3-carbox-2'-methyl-4'-chloroanilide. The synthetic yields, elemental analysis, and physical properties of these fluorinated trisazo pigments are provided in Appendix II, Table II. The substituents X, Y, and Z and the names of the fluorinated triazo pigment products are designated in Appendix III, Table III. >for melting point (m.p.) is the point at which the melting point determination, which melting point was determined by capillary melting point apparatus, or can be determined by other known methods, was terminated.

EXAMPLE VI

There was prepared a layered photoconductive imaging member containing the fluorinated trisazo photogenerating pigment obtained from Example IV, tris[4-(1'-azo-2'-hydroxy-8'-chloro-11'H-benzo(a)carbazole-3'-carbox-2''-fluoro-4''-chloroanilide)phenyl]amine, Compound 2, Appendix III, Table III.

The photogenerating pigment dispersion was prepared by first dissolving in a 1 ounce brown bottle 52.8 milligrams of polyvinyl formal (obtained from Scientific Polymer Products, Inc., formal content 82 percent, acetate content 12 percent, hydroxy content 6 percent) and 10 milliliters of tetrahydrofuran. To the bottle was then added 211.2 milligrams of the above fluorinated trisazo pigment, tris[4-(1'-azo-2'-hydroxy-8'-chloro-11'H-benzo(a)carbazole-3'-carbox-2''-fluoro-4''-chloroanilide)phenyl]amine and about 90 grams of steel shot (⅛ inch diameter, number 302 stainless steel shot). The bottle was then placed on a Red Devil Paint Conditioner (Model 5100X) and shaken for about 30 minutes. The resulting dispersion was coated onto a 7.5 inch by 10 inch brush-grained aluminum substrate obtained from Ron Ink Company using a Gardner Mechanical Drive with a 6 inch wide Bird Film Applicator (0.5 mil wet gap) inside a humidity controlled glove box. The relative humidity of the glove box was controlled by dry air to about 25 percent, or less. The resulting photogenerator layer was air dried for about 30 minutes and then vacuum dried for about 1 hour at 100° C. before further coating. The thickness of the charge generator layer was about 0.4 micron as estimated from TEM micrographs.

The above charge generator layer was overcoated with a hole transport layer comprised of 60 weight percent of the polycarbonate MAKROLON® obtained from Larkensabricken Bayer AG, and 40 percent of aryl diamine hole transport molecules prepared as follows. A solution containing 4.2 grams of MAKROLON®, a polycarbonate resin obtained from Larbensabricken Bayer A.G., 2.8 grams of N,N'-bis(3''-methylphenyl)-1,1'-biphenyl-4,4'-diamine, reference in U.S. Pat. No. 4,265,990, the disclosure of which is totally incorporated herein by reference, was prepared by dissolving the above materials in 31 milliliters of methylene chloride inside a 2 ounce amber bottle. The transport layer was obtained by coating the solution onto the above charge generator layer using a 3.5 inch wide, 5 mil wet gap Bird Film Applicator, resulting in a transport layer about 27 microns thick. The resulting photoconductive device was air dried for about 1 hour and vacuum dried at 100° C. for about 16 hours before evaluation on a flat plate imaging test fixture.

More specifically, the imaging member thus prepared was evaluated as follows. Xerographic measurements were made on a flat plate scanner using 2 inch by 2.5 inch samples of the imaging member prepared as described herein. The surface potential of the device was monitored with a capacitively coupled ring probe connected to a Keithley electrometer (Model 610C) in the coulomb mode. The output of the electrometer was displayed on a strip-chart recorder (HP Model 740A) which was calibrated by applying known voltage on an uncoated aluminum substrate. The exposure wavelength and the intensity were selected and adjusted using interference and neutral density filters, respectively. With the shutter closed, the dark decay was measured. With the shutter open, the photosensitivity at a known light exposure was recorded. The imaging member was charged to about $-1,000$ volts at the peak voltage and was allowed to discharge in the dark for 2 to 3 seconds to determine the dark decay. Subsequently, the imaging member was exposed to an erase lamp to photodischarge the surface charge and to determine its residual voltage ($V_R$). Thereafter, the imaging member was charged in a similar manner and exposed to monochromatic radiation at the dark development potential ($V_{ddp}$), and the sensitivity of the member was determined in terms of $E_{\frac{1}{2}}$, which represents the energy required to discharge half of the dark development potential. The imaging member exhibited a dark development potential ($V_{ddp}$) of $-920$ volts, a dark decay of $-32$ volts per second, an $E_{\frac{1}{2}ddp}$, the energy to discharge half the potential at 600 nanometers (erg/cm$^2$) of 3.5 and and $E_{\frac{1}{2}ddp}$, the energy to discharge half the potential at 790 nanometers (erg/cm$^2$), of 2.9. The electrical values are tabulated in Appendix IV, Table IV for a number of imaging members wherein the photogenerating compound is as indicated, 2 to 24, and which imaging members were prepared in accordance with the above process.

EXAMPLE VII

A number of photoconductive imaging members were prepared by repeating the procedure of Example VI with the exceptions that there were selected as the photogenerating pigments those as represented by the formulas of Compounds 3 to 24, respectively, of Appendix III, Table III. The xerographic characteristics of these imaging members were then evaluated on a flat plate scanner as described in Example VI, and the results thereof are provided in Appendix IV, Table IV that follows.

EXAMPLE VIII

There was prepared a photoconductive imaging member containing the fluorinated trisazo pigment as prepared in accodance with Example IV with the exception that after the isolation of the crude pigment product (by filtration), the crude product was purified by washing with DMF ($3 \times 250$ milliliters at 90° C.), water ($2 \times 250$ milliliters at 90° C.), acetone and ether, yielding the pigment in about 70 percent yield. An imaging member was then prepared with the aforementioned pigment by repeating the device fabrication and evaluation procedures in Example VI. The imaging member exhibited a dark development potential ($V_{ddp}$) of $-920$ volts, a dark decay of $-38$ volts per second, an $E_{\frac{1}{2}ddp}$, the energy to discharge half of the potential at 600 nanometers (ergs/cm$^2$) of 3.5, and an $E_{\frac{1}{2}ddp}$, the energy to discharge half of the potential at 790 nanometers (ergs/cm$^2$), of 2.1.

EXAMPLE IX

There was prepared a photoconductive imaging member containing the fluorinated trisazo pigment as prepared in accordance with Example IV with the exception that after the isolation of the crude pigment product (by filtration), the crude product was purified by washing with DMF ($3 \times 250$ milliliters at 100° C.), water ($2 \times 250$ milliliters at 80° C.), acetone and ether, yielding the pigment in about 70 percent yield. An imaging member was then prepared with the aforementioned pigment by repeating the device fabrication and evaluation procedures in Example VI. The imaging member exhibited a dark development potential ($V_{ddp}$)

of $-910$ volts, a dark decay of $-30$ volts per second, an $E_{\frac{1}{2}ddp}$, the energy to discharge half of the potential at 600 nanometers (ergs/cm$^2$), of 3.9, and an $E_{\frac{1}{2}ddp}$, the energy to discharge half of the potential at 790 nanometers (ergs/cm$^2$), of 2.2.

Other embodiments and modifications of the present invention may occur to those skilled in the art subsequent to a review of the information presented herein; these embodiments and modifications, as well as equivalents thereof, are also included within the scope of this invention.

TABLE I

APPENDIX I
Anilide Intermediates Prepared in Example III

| Anilide Product Name | Yield (%) | m.p. (°C.) | IR (cm$^{-1}$) |
|---|---|---|---|
| 2-hydroxy-8-chloro-11H-benzo(a)carbazole-3-carbox-p-fluoroanilide | 78 | >310 | 3302 and 3448 (N—H), 3065 (aromatic C—H), 1656 (amide C = O) |
| 2-hydroxy-8-chloro-11H-benzo(a)carbazole-3-carbox-m-trifluoromethylanilide | 91 | >310 | 3320 (N—H), 3075 (aromatic C—H) and 1661 (amide C = O) |
| 2-hydroxy-8-chloro-11H-benzo(a)carbazole-3-carbox-o-fluoroanilide | 80 | >310 | 3285 and 3434 (N—H), 3070 (aromatic), 1642 (amide C = O) |
| 2-hydroxy-8-chloro-11H-benzo(a)carbazole-3-carbox-m-fluoroanilide | 73 | >310 | 3306 and 3448 (N—H), 1660 (amide C = O) |
| 2-hydroxy-8-chloro-11H-benzo(a)carbazole-3-carbox-3'-chloro-4'-fluoroanilide | 55 | >310 | 3360 and 3440 (N—H), 1658 (amide C = O) |
| 2-hydroxy-8-chloro-11H-benzo(a)carbazole-3-carbox-3',5'-difluoroanilide | 71 | >310 | 3360 and 3480 (N—H), 3102 (aromatic C—H), 1665 (amide C = O) |
| 2-hydroxy-8-chloro-11H-benzo(a)carbazole-3-carbox-2',4'-difluoroanilide | 81 | >310 | 3335 and 3462 (N—H), 3080 (aromatic C—H), 1662 (amide C = O) |
| 2-hydroxy-8-chloro-11H-benzo(a)carbazole-3-carbox-2',3'-difluoroanilide | 83 | >310 | 3475 (N—H) and 1654 (amide C = O) |
| 2-hydroxy-8-fluoro-11H-benzo(a)carbazole-3-carboxanilide | 80 | >310 | 3310 and 3440 (N—H), 3058 (aromatic C—H), 1657 (amide C = O) |
| 2-hydroxy-8-fluoro-11H-benzo(a)carbazole-3-carbox-p-chloroanilide | 87 | >310 | 3320 and 3440 (N—H), 3078 (aromatic C—H), 1652 (amide C = O) |
| 2-hydroxy-8-fluoro-11H-benzo(a)carbazole-3-carbox-o-ethylanilide | 83 | 279 | 3358 (N—H), 3062 (aromatic C—H) and 1656 (amide C = O) |
| 2-hydroxy-8-fluoro-11H-benzo(a)carbazole-3-carbox-p-fluoroanilide | 80 | >310 | 3305 and 3456 (N—H), 3062 (aromatic C—H), 1657 (amide C = O) |
| 2-hydroxy-8-fluoro-11H-benzo(a)carbazole-3-carbox-2',4'-difluoroanilide | 71 | >300 | 3450 (N—H) and 1656 (amide C = O) |
| 2-hydroxy-8-fluoro-11H-benzo(a)carbazole-3-carbox-2',4'-dichloroanilide | 82 | >300 | 3390 and 3424 (N—H), and 1665 (amide C = O) |
| 2-hydroxy-8-fluoro-11H-benzo(a)carbazole-3-carbox-2'-chloro-4'-methylanilide | 60 | >300 | 3340 and 3415 (N—H), and 1648 (amide C = O) |
| 2-hydroxy-8-fluoro-11H-benzo(a)carbazole-3-carbox-m-trifluoromethylanilide | 61 | >300 | 3376 and 3440 (N—H), and 1654 (amide C = O) |
| 2-hydroxy-8-fluoro-11H-benzo(a)carbazole-3-carbox-3'-chloro-4'-fluoroanilide | 37 | >300 | 3360 and 3418 (N—H), and 1652 (amide C = O) |
| 2-hydroxy-8-fluoro-11H-benzo(a)carbazole-3-carbox-m-nitroanilide | 25 | >300 | 3380 and 3418 (N—H), 3100 (aromatic C—H), 1656 (amide C = O) |
| 2-hydroxy-8-fluoro-11H-benzo(a)carbazole-3-carbox-2'-methyl-4'-fluoroanilide | 69 | >300 | 3356 and 3452 (N—H), 3064 (aromatic C—H), 1656 (amide C = O) |
| 2-hydroxy-8-fluoro-11H-benzo(a)carbazole-3-carbox-2'-chloro-4'-fluoroanilide | 66 | >300 | 3348 and 3437 (N—H), and 1660 (amide C = O) |
| 2-hydroxy-8-fluoro-11H-benzo(a)carbazole-3-carbox-2'-methyl-4'-chloroanilide | 76 | >300 | 3354 and 3440 (N—H), and 1652 (amide C = O) |

TABLE II

APPENDIX II
Fluorinated Trisazo Pigments Prepared in Example V

| Compound # | % Yield | | C | H | N | m.p. (°C.) | IR (C = O) cm$^{-1}$ |
|---|---|---|---|---|---|---|---|
| 3 | 81 | calc'd: | 67.95 | 3.34 | 11.84 | >310 | 1674 |
| | | found: | 67.61 | 3.63 | 12.19 | | |
| 4 | 89 | calc'd: | 64.05 | 3.04 | 10.79 | >310 | 1680 |
| | | found: | 63.84 | 3.51 | 10.60 | | |
| 5 | 88 | calc'd: | 67.95 | 3.34 | 11.84 | >310 | 1678 |
| | | found: | 66.97 | 3.78 | 11.59 | | |
| 6 | 88 | calc'd: | 67.95 | 3.34 | 11.84 | >310 | 1678 |
| | | found: | 67.09 | 3.62 | 11.71 | | |
| 7 | 86 | calc'd: | 63.67 | 2.95 | 11.10 | >310 | 1677 |
| | | found: | 63.42 | 3.20 | 11.45 | | |
| 8 | 75 | calc'd: | 65.64 | 3.03 | 11.44 | >310 | 1680,1686 |
| | | found: | 65.14 | 3.33 | 11.45 | | |
| 9 | 82 | calc'd: | 65.64 | 3.03 | 11.44 | >310 | 1678 |
| | | found: | 65.18 | 3.19 | 11.29 | | |
| 10 | 91 | calc'd: | 65.64 | 3.03 | 11.44 | >310 | 1680,1685 |
| | | found: | 65.28 | 3.30 | 11.35 | | |
| 11 | 78 | calc'd: | 72.85 | 3.79 | 12.69 | >310 | 1675 |
| | | found: | 72.39 | 3.34 | 12.50 | | |
| 12 | 72 | calc'd: | 67.95 | 3.34 | 11.84 | >310 | 1677 |
| | | found: | 67.64 | 3.17 | 12.04 | | |

TABLE II-continued
APPENDIX II
Fluorinated Trisazo Pigments Prepared in Example V

| Compound # | % Yield | | C | H | N | m.p. (°C.) | IR (C = O) cm$^{-1}$ |
|---|---|---|---|---|---|---|---|
| 13 | 74 | calc'd: | 73.55 | 4.38 | 11.99 | >310 | 1678 |
| | | found: | 72.92 | 4.62 | 11.72 | | |
| 14 | 47 | calc'd: | 70.20 | 3.45 | 12.23 | >310 | 1679 |
| | | found: | 69.91 | 3.22 | 11.81 | | |
| 15 | 72 | calc'd: | 65.64 | 3.03 | 11.44 | >310 | 1680 |
| | | found: | 65.00 | 3.17 | 11.02 | | |
| 16 | 79 | calc'd: | 67.75 | 3.14 | 11.81 | >310 | 1679 |
| | | found: | 67.54 | 3.23 | 12.12 | | |
| 17 | 74 | calc'd: | 63.67 | 2.95 | 11.10 | >310 | 1679,1683 |
| | | found: | 63.48 | 2.99 | 10.91 | | |
| 18 | 87 | calc'd: | 68.42 | 3.64 | 11.52 | >310 | 1676 |
| | | found: | 68.04 | 3.69 | 11.23 | | |
| 19 | 83 | calc'd: | 65.98 | 3.14 | 11.11 | >310 | 1678,1681 |
| | | found: | 65.95 | 3.03 | 10.84 | | |
| 20 | 62 | calc'd: | 65.65 | 3.04 | 11.44 | >310 | 1677 |
| | | found: | 65.80 | 3.19 | 11.32 | | |
| 21 | 72 | calc'd: | 75.29 | 5.91 | 4.74 | >310 | 1679,1686 |
| | | found: | 74.25 | 5.58 | 4.56 | | |
| 22 | 65 | calc'd: | 70.63 | 3.75 | 11.90 | >310 | 1679 |
| | | found: | 69.26 | 3.85 | 11.59 | | |
| 23 | 78 | calc'd: | 65.64 | 3.03 | 11.44 | >310 | 1677 |
| | | found: | 65.22 | 3.05 | 11.07 | | |
| 24 | 75 | calc'd: | 68.42 | 3.64 | 11.52 | >310 | 1679 |
| | | found: | 68.17 | 3.79 | 11.14 | | |

TABLE III
APPENDIX III
Fluorinated Trisazo Pigments Prepared in Example V - Substituents and Names

| CPD # | X | Y | Z | Name |
|---|---|---|---|---|
| 2 | Cl | F | Cl | tris[4-(1'-azo-2'-hydroxy-8'-chloro-11'H-benzo(a)carbazole-3'-carbox-2"-fluoro-4"-chloroanilide)phenyl]amine |
| 3 | Cl | H | F | tris[4-(1'-azo-2'-hydroxy-8'-chloro-11'H-benzo(a)carbazole-3'-carbox-p-fluoroanilide)phenyl]amine |
| 4 | Cl | H | CF$_3$ | tris[4-(1'-azo-2'-hydroxy-8'-chloro-11'H-benzo(a)carbazole-3'-carbox-m-trifluoromethylanilide)phenyl]amine |
| 5 | Cl | F | H | tris[4-(1'-azo-2'-hydroxy-8'-chloro-11'H-benzo(a)carbazole-3'-carbox-o-fluoroanilide)phenyl]amine |
| 6 | Cl | H | F | tris[4-(1'-azo-2'-hydroxy-8'-chloro-11'H-benzo(a)carbazole-3'-carbox-m-fluoroanilide)phenyl]amine |
| 7 | Cl | Cl | F | tris[4-(1'-azo-2'-hydroxy-8'-chloro-11'H-benzo(a)carbazole-3'-carbox-3"-chloro-4"-fluoroanilide)phenyl]amine |
| 8 | Cl | F | F | tris[4-(1'-azo-2'-hydroxy-8'-chloro-11'H-benzo(a)carbazole-3'-carbox-3",5"-difluoroanilide)phenyl]amine |
| 9 | Cl | F | F | tris[4-(1'-azo-2'-hydroxy-8'-chloro-11'H-benzo(a)carbazole-3'-carbox-2",4"-difluoroanilide)phenyl]amine |
| 10 | Cl | F | F | tris[4-(1'-azo-2'-hydroxy-8'-chloro-11'H-benzo(a)carbazole-3'-carbox-2",3"-difluoroanilide)phenyl]amine |
| 11 | F | H | H | tris[4-(1'-azo-2'-hydroxy-8'-fluoro-11'H-benzo(a)carbazole-3'-carboxanilide)phenyl]amine |
| 12 | F | H | Cl | tris[4-(1'-azo-2'-hydroxy-8'-fluoro-11'H-benzo(a)carbazole-3'-carbox-p-chloroanilide)phenyl]amine |
| 13 | F | —C$_2$H$_5$ | H | tris[4-(1'-azo-2'-hydroxy-8'-fluoro-11'H-benzo(a)carbazole-3'-carbox-o-ethylanilide)phenyl]amine |
| 14 | F | H | F | tris[4-(1'-azo-2'-hydroxy-8'-fluoro-11'H-benzo(a)carbazole-3'-carbox-p-fluoroanilide)phenyl]amine |
| 15 | F | F | Cl | tris[4-(1'-azo-2'-hydroxy-8'-fluoro-11'H-benzo(a)carbazole-3'-carbox-2"-fluoro-4"-chloroanilide)phenyl]amine |
| 16 | F | F | F | tris[4-(1'-azo-2'-hydroxy-8'-fluoro-11'H-benzo(a)carbazole-3'-carbox-2",4"-difluoroanilide)phenyl]amine |
| 17 | F | Cl | Cl | tris[4-(1'-azo-2'-hydroxy-8'-fluoro-11'H-benzo(a)carbazole-3'-carbox-2",4"-dichloroanilide)phenyl]amine |
| 18 | F | Cl | CH$_3$ | tris[4-(1'-azo-2'-hydroxy-8'-fluoro-11'H-benzo(a)carbazole-3'-carbox-2"-chloro-4"-methylanilide)phenyl]amine |
| 19 | F | H | CF$_3$ | tris[4-(1'-azo-2'-hydroxy-8'-fluoro-11'H-benzo(a)carbazole-3'-carbox-m-trifluoromethylanilide)phenyl]amine |
| 20 | F | Cl | F | tris[4-(1'-azo-2'-hydroxy-8'-fluoro-11'H-benzo(a)carbazole-3'-carbox-3"-chloro-4"-fluoroanilide)phenyl]amine |
| 21 | F | H | NO$_2$ | tris[4-(1'-azo-2'-hydroxy-8'-fluoro-11'H-benzo(a)carbazole-3'-carbox-m-nitroanilide)phenyl]amine |
| 22 | F | CH$_3$ | F | tris[4-(1'-azo-2'-hydroxy-8'-fluoro-11'H-benzo(a)carbazole-3'-carbox-2"-methyl-4"-fluoroanilide)phenyl]amine |
| 23 | F | Cl | F | tris[4-(1'-azo-2'-hydroxy-8'-fluoro-11'H-benzo(a)carbazole-3'-carbox-2"-chloro-4"-fluoroanilide)phenyl]amine |
| 24 | F | CH$_3$ | Cl | tris[4-(1'-azo-2'-hydroxy-8'-fluoro-11'H-benzo(a)carbazole-3'-carbox-2"-methyl-4"-chloroanilide)phenyl]amine |

TABLE IV
APPENDIX IV
Fluorinated Trisazo Pigments and Xerographic Characteristics of Photoconducting Imaging Members

| Compound Figure # | $V_{ddp}$ (V) | Dark Decay (V/sec) | E$^{\frac{1}{2}}$ (ergs/cm$^2$) 600 nm, | 790 nm |
|---|---|---|---|---|
| 2 | −920 | −32 | 3.5, | 2.9 |
| 3 | −820 | −140 | 7.8, | 4.7 |
| 4 | −800 | −35 | 6.5, | 4.7 |
| 5 | −870 | −45 | 5.0, | 10.7 |
| 6 | −800 | −67 | 3.0, | 4.8 |
| 7 | −540 | −80 | 2.7, | 4.7 |
| 8 | −940 | −34 | 4.4, | 7.4 |
| 9 | −920 | −16 | 7.4, | 4.7 |
| 10 | −970 | −22 | 8.1, | 16.4 |
| 11 | −960 | −12 | 11.4, | 9.3 |
| 12 | −920 | −53 | 7.4, | 4.6 |
| 13 | −980 | −22 | 9.5, | 5.5 |
| 14 | −920 | −27 | 6.5, | 6.3 |
| 15 | −850 | −45 | 3.7, | 3.8 |
| 16 | −910 | −32 | 2.9, | 5.7 |
| 17 | −930 | −32 | 3.5, | 10.4 |
| 18 | −900 | −38 | 20.1, | 33.0 |
| 19 | −800 | −64 | 6.5, | 6.2 |
| 20 | −880 | −70 | 5.2, | 4.4 |
| 21 | −820 | −95 | 4.2, | 4.4 |
| 22 | −920 | −50 | 8.6, | 6.6 |
| 23 | −920 | −44 | 3.7, | 9.1 |
| 24 | −830 | −40 | 2.7, | 3.6 |

What is claimed is:

1. An imaging member comprised of a supporting substrate, a charge transport layer, and a photogenerating layer of a trisazo pigment selected from the group consisting of tris[4-(1'-azo-2'-hydroxy-8'-chloro-11'H-benzo(a)carbazole-3'-carbox-2''-fluoro-4''-chloroanilide)phenyl]amine; tris[4-(1'-azo-2'-hydroxy-8'-chloro-11'H-benzo(a)carbazole-3'-carbox-p-fluoroanilide)phenyl]amine; tris[4-(1'-azo-2'-hydroxy-8'-chloro-11'H-benzo(a)carbazole-3'-carbox-m-trifluoromethylanilide)phenyl]amine; tris[4-(1'-azo-2'-hydroxy-8'-chloro-11'H-benzo(a)carbazole-3'-carbox-o-fluoroanilide)phenyl]amine; tris[4-(1'-azo-2'-hydroxy-8'-chloro-11'H-benzo(a)carbazole-3'-carbox-m-fluoroanilide)phenyl]amine; tris[4(1'-azo-2'-hydroxy-8'-chloro-11'H-benzo(a)carbazole-3'-carbox-3''-chloro-4''-fluoroanilide)phenyl]amine; tris[4-(1'-azo-2'-hydroxy-8'-chloro-11'H-benzo(a)carbazole-3'-carbox-3'', 5''-difluoroanilide)phenyl]amine; tris[4-(1'-azo-2'-hydroxy-8'-chloro-11'H-benzo(a)carbazole-3'-carbox-2'', 4''-difluoroanilide)phenyl]amine; tris[4-(1'-azo-2'-hydroxy-8'-chloro-11'H-benzo(a)carbazole-3'-carbox-2'', 3''-difluoroanilide)phenyl]amine; tris[4-(1'-azo-2'-hydroxy-8'-fluoro-11'H-benzo(a)carbazole-3'-carboxanilide)-phenyl]amine; tris[4-(1'-azo-2'-hydroxy-8'-fluoro-11'H-benzo(a)carbazole-3'-carbox-p-chloroanilide)phenyl]amine; tris[4-(1'-azo-2'-hydroxy-8'-fluoro-11'H-benzo(a)carbazole-3'-carbox-o-ethylanilide)phenyl]amine; tris[4-(1'-azo-2'-hydroxy-8'-fluoro-11'H-benzo(a)carbazole-3'-carbox-p-fluoroanilide)phenyl]amine; tris[4-(1'-azo-2'-hydroxy-8'-fluoro-11'H-benzo(a)carbazole-3'-carbox-2''-fluoro-4''-chloroanilide)phenyl]amine; tris[4-(1'-azo-2'-hydroxy-8'-fluoro-11'H-benzo(a)carbazole-3'-carbox-2'', 4''-difluoroanilide)phenyl]amine; tris[4-(1'-azo-2'-hydroxy-8'-fluoro-11'H-benzo(a)carbazole-3'-carbox-2'', 4''-dichloroanilide)phenyl]amine; tris[4-(1'-azo-2'-hydroxy-8'-fluoro-11'H-benzo(a)carbazole-3'-carbox-2''-chloro-4''-methylanilide)phenyl]amine; tris[4-(1'-azo-2'-hydroxy-8'-fluoro-11'H-benzo(a)carbazole-3'-carbox-m-trifluoromethylanilide)phenyl]amine; tris[4-(1'-azo-2'-hydroxy-8'-fluoro-11'H-benzo(a)carbazole-3'-carbox-3''-chloro-4''-fluoroanilide)phenyl]amine; tris[4-(1'-azo-2'-hydroxy-8'-fluoro-11'H-benzo(a)carbazole-3'-carbox-m-nitroanilide)phenyl]amine; tris[4-(1'-azo-2'-hydroxy-8'-fluoro-11'H-benzo(a)carbazole-3'-carbox-2''-methyl-4''-fluoroanilide)phenyl]amine; tris[4-(1'-azo-2'-hydroxy-8'-fluoro-11'H-benzo(a)carbazole-3'-carbox-2''-chloro-4''-fluoroanilide)phenyl]amine; and tris[4-(1'-azo-2'-hydroxy-8'-fluoro-11'H-benzo(a)carbazole-3'-carbox-2''-methyl-4''-chloroanilide)phenyl]amine.

2. An imaging member comprised of a trisazo photogenerating pigment or pigments selected from the group consisting of tris[4-(1'-azo-2'-hydroxy-8'-chloro-11'H-benzo(a)carbazole-3'-carbox-2''-fluoro-4''-chloroanilide)phenyl]amine; tris[4-(1'-azo-2'-hydroxy-8'-chloro-11'H-benzo(a)carbazole-3'-carbox-p-fluoroanilide)phenyl]amine; tris[4-(1'-azo-2'-hydroxy-8'-chloro-11'H-benzo(a)carbazole-3'-carbox-m-trifluoromethylanilide)phenyl]amine; tris[4-(1'-azo-2'-hydroxy-8'-chloro-11'H-benzo(a)carbazole-3'-carbox-o-fluoroanilide)phenyl]amine; tris[4-(1'-azo-2'-hydroxy-8'-chloro-11'H-benzo(a)carbazole-3'-carbox-m-fluoroanilide)phenyl]amine; tris[4-(1'-azo-2'-hydroxy-8'-chloro-11'H-benzo(a)carbazole-3'-carbox-3''-chloro-4''-fluoroanilide)phenyl]amine; tris[4-(1'-azo-2'-hydroxy-8'-chloro-11'H-benzo(a)carbazole-3'-carbox-3'',5''-difluoroanilide)phenyl]amine; tris[4-(1'-azo-2'-hydroxy-8'-chloro-11'H-benzo(a)carbazole-3'-carbox-2'',4''-difluoroanilide)phenyl]amine; tris[4-(1'-azo-2'-hydroxy-8'-chloro-11'H-benzo(a)carbazole-3'-carbox-2'',3''-difluoroanilide)phenyl]amine; tris[4-(1'-azo-2'-hydroxy-8'-fluoro-11'H-benzo(a)carbazole-3'-carboxanilide)phenyl]amine; tris[4-(1'-azo-2'-hydroxy-8'-fluoro-11'H-benzo(a)carbazole-3'-carbox-p-chloroanilide)phenyl]amine; tris[4-(1'-azo-2'-hydroxy-8'-fluoro-11'H-benzo(a)carbazole-3'-carbox-o-ethylanilide)phenyl]amine; tris[4-(1'-azo-2'-hydroxy-8'-fluoro-11'H-benzo(a)carbazole-3'-carbox-p-fluoroanilide)phenyl]amine; tris[4-(1'-azo-2'-hydroxy-8'-fluoro-11'H-benzo(a)carbazole-3'-carbox-2''-fluoro-4''-chloroanilide)phenyl]amine; tris[4-(1'-azo-2'-hydroxy-8'-fluoro-11'H-benzo(a)carbazole-3'-carbox-2'',4''-difluoroanilide)phenyl]amine; tris[4-(1'-azo-2'-hydroxy-8'-fluoro-11'H-benzo(a)carbazole-3'-carbox-2'',4''-dichloroanilide)phenyl]amine; tris[4-(1'-azo-2'-hydroxy-8'-fluoro-11'H-benzo(a)carbazole-3'-carbox-2''-chloro-4''-methylanilide)phenyl]amine; tris[4-(1'-azo-2'-hydroxy-8'-fluoro-11'H-benzo(a)carbazole-3'-carbox-m-trifluoromethylanilide)phenyl]amine; tris[4-(1'-azo-2'-hydroxy-8'-fluoro-11'H-benzo(a)carbazole-3'-carbox-3''-chloro-4''-fluoroanilide)phenyl]amine; tris[4-(1'-azo-2'-hydroxy-8'-fluoro-11'H-benzo(a)carbazole-3'-carbox-m-nitroanilide)phenyl]amine; tris[4-(1'-azo-2'-hydroxy-8'-fluoro-11'H-benzo(a)carbazole-3'-carbox-2''-methyl-4''-fluoroanilide)phenyl]amine; tris[4-(1'-azo-2'-hydroxy-8'-fluoro-11'H-benzo(a)carbazole-3'-carbox-2''-chloro-4''-fluoroanilide)phenyl]amine; and tris[4-(1'-azo-2'-hydroxy-8'-fluoro-11'H-benzo(a)carbazole-3'-carbox-2''-methyl-4''-chloroanilide)phenyl]amine; and in contact therewith a charge transport layer.

3. An imaging member according to claim 1, wherein the photogenerator layer is situated between the substrate and the charge transport layer.

4. An imaging member according to claim 1 wherein the charge transport layer is situated between the substrate and the photogenerator layer.

5. An imaging member according to claim 1 wherein the supporting substrate is comprised of a conductive substrate comprised of a metal.

6. An imaging member according to claim 5, wherein the conductive substrate is aluminum.

7. An imaging member according to claim 1 wherein the photogenerator layer has a thickness of from about 0.05 to about 10 microns.

8. An imaging member according to claim 2 wherein the photogenerator layer has a thickness of from about 0.05 to about 10 microns.

9. An imaging member according to claim 1 wherein the photogenerating compound is dispersed in a resinous binder in an amount of from about 5 percent by weight to about 95 percent by weight.

10. An imaging member according to claim 9 wherein the resinous binder is selected from the group consisting of polyesters, polyvinyl butyrals, polycarbonates, and polyvinyl formals.

11. An imaging member according to claim 1 wherein the charge transport layer comprises aryl amine molecules.

12. An imaging member according to claim 11 wherein the aryl amine is of the formula wherein X, Y and Z are selected from the group consisting of hydrogen, alkyl and halogen and wherein the aryl amine is dispersed in a highly insulating and transparent organic resinous binder.

13. An imaging member according to claim 11 wherein alkyl contains from about 1 to about 25 carbon atoms.

14. An imaging member according to claim 13 wherein alkyl contains from 1 to about 10 carbon atoms.

15. An imaging member according to claim 13 wherein alkyl is methyl.

16. An imaging member according to claim 12 wherein halogen is chloride.

17. An imaging member according to claim 12 wherein the resinous binder is selected from the group consisting of polycarbonates and polystyrenes.

18. A method of imaging which comprises generating an electrostatic latent image on an imaging member of claim 1, developing the latent image, and transferring the developed electrostatic image to a suitable substrate.

19. A method of imaging which comprises generating an electrostatic latent image on an imaging member of claim 2, developing the latent image, and transferring the developed electrostatic image to a suitable substrate.

20. An imaging member in accordance with claim 1 sensitive to light of a wavelength of from about 400 to about 800 nanometers.

21. An imaging member in accordance with claim 2 sensitive to light of a wavelength of from about 400 to about 800 nanometers.

22. An imaging member in accordance with claim 1 with a sensitivity $E_{0.5}$ at 600 nanometers of 3.5, 6.5, 3.0, 3.7, 2.9 or 2.7.

23. An imaging member in accordance with claim 1 with a sensitivity $E_{0.5}$ at 790 nanometers of 2.9, 4.7, 4.8, 3.8, 5.7 or 3.6.

24. An imaging member comprised of a supporting substrate a charge transport layer and therebetween a photogenerating layer of a trisazo pigment selected from the group consisting of: tris[4-(1'-azo-2'-hydroxy-8'-chloro-11'H-benzo(a)carbazole-3'-carbox-2''-fluoro-4''-chloroanilide)phenyl]amine; tris[4-(1'-azo-2'-hydroxy-8'-chloro-11'H-benzo(a)carbazole-3'-carbox-m-trifluoromethylanilide)phenyl]amine; tris[4-(1'-azo-2'-hydroxy-8'-chloro-11'H-benzo(a)carbazole-3'-carbox-m-fluoroanilide)phenyl]amine; tris[4-(1'-azo-2'-hydroxy-8'-fluoro-11'H-benzo(a)carbazole-3'-carbox-2''-fluoro-4''-chloroanilide)phenyl]amine; tris[4-(1'-azo-2'-hydroxy-8'-fluoro-11'H-benzo(a)carbazole-3'-carbox-2'',4''-difluoroanilide)phenyl]amine; or tris[4-(1'-azo-2'-hydroxy-8'-fluoro-11'H-benzo(a)carbazole-3'-carbox-2''-methyl-4''-chloroanilide)phenyl]amine.

25. An imaging member in accordance with claim 24 wherein the supporting substrate is aluminum, the charge transport layer is comprised of N,N'-bis(3''-methylphenyl)-1,1'-biphenyl-4,4-diamine, and the photogenerating layer is comprised of tris[4-(1'-azo-2'-hydroxy-8'-chloro-11'H-benzo(a)carbazole-3'-carbox-2''-fluoro-4''-chloroanilide)phenyl]amine.

* * * * *